(12) United States Patent
Lai

(10) Patent No.: US 6,568,843 B1
(45) Date of Patent: May 27, 2003

(54) SAFETY DEVICE FOR A BLENDER

(76) Inventor: A-Pi Lai, No. 147, Sec. 2, Min-Chuan Rd., Chung-Li City, Taoyuan Hsien (TW)

( * ) Notice: Subject to any disclaimer, the term of this patent is extended or adjusted under 35 U.S.C. 154(b) by 0 days.

(21) Appl. No.: 10/188,632

(22) Filed: Jul. 3, 2002

(51) Int. Cl.$^7$ ............................................... A47J 43/046
(52) U.S. Cl. ..................................... 366/206; 241/37.5
(58) Field of Search .................................. 366/205, 206, 366/314, 601; 99/348; 241/37.5

(56) References Cited

U.S. PATENT DOCUMENTS

| | | | |
|---|---|---|---|
| 3,892,365 A | * | 7/1975 | Verdun |
| 5,353,697 A | * | 10/1994 | Venturati et al. |
| 5,567,049 A | * | 10/1996 | Beaudet et al. |
| 6,375,102 B1 | * | 4/2002 | Bouleau et al. |
| 2002/0071340 A1 | * | 6/2002 | Juriga |

FOREIGN PATENT DOCUMENTS

| | | | |
|---|---|---|---|
| EP | 571348 | * | 11/1993 |
| GB | 2352648 | * | 2/2001 |

* cited by examiner

*Primary Examiner*—Charles E. Cooley
(74) *Attorney, Agent, or Firm*—Hedman & Costigan, P.C.

(57) ABSTRACT

A safety device for a blender has a press movably mounted on top of the handle and having two first extensions selectively extending into the two holes in the handle and a sliding block selectively engaged by the two first extensions and movably received in the handle. The sliding block has two second extensions formed on a bottom of the sliding block to correspond to two holes in the base of the blender. The movement of the press forces the sliding block to move accordingly, such that movement of the two second extensions forces a first contacting plate which is connected to a motor to engage with a second contacting plate which is connected to a power source to complete a circuit of the blender so that the motor is able to drive the blade to rotate.

4 Claims, 7 Drawing Sheets

SAFETY DEVICE FOR A BLENDER

BACKGROUND OF THE INVENTION

1. Field of the Invention

The present invention relates to safety device for a blender, and more particularly to a safety device for use with a blender to ensure that only when the cover of the blender is secured to the cup, the blade in the cup is driven to rotate.

2. Description of Related Art

A conventional blender has a base with a motor received therein and a motor extending out from a top face of the base, a cup detachably mounted on top of the base and having a blade rotatably received in the cup and operably connected to the motor shaft, and a cover detachably mounted on top of the cup to cover the opening end of the cup so that when the blade is rotated, the juice inside the cup is not spilled. The blender has a switch mounted on an outer periphery of the base so that when required, the user is able to use the switch to control the rotation of the blade. However, some users often turn on the blender without covering the cup so that not only may the juice spill out of the cup, but also the blade may hurt the user. Especially, small children often stick their fingers into the cup while the cover is not applied and the blade is rotating, which is very dangerous and thus causes harm to the children.

To overcome the shortcomings, the present invention tends to provide an improved ornamental light structure to mitigate and obviate the aforementioned problems.

SUMMARY OF THE INVENTION

The primary objective of the present invention is to provide a safety device for the blender so as to secure the safety of the user.

In order to accomplish the foregoing objective, the safety device includes a switch adapted to be received in the base, two first holes defined in a top face of the base, two second holes adapted to be defined in a top face of the hollow handle to communicate with an inside of the hollow handle, two third holes adapted to be defined in a bottom face of the hollow handle, a first stop adapted to be formed on an inner periphery of the hollow handle, a sliding block adapted to be movably received inside the hollow handle, an elongated through hole longitudinally defined in the sliding block to correspond to the first stop, a second stop formed on an inner face of the sliding block, a first spring connected between the first stop and the second stop to provide a recoil force to the sliding block and two extensions respectively formed on a bottom of the sliding block to selectively extend out from the two third holes to correspond to the two first holes so as to engage with and press the second contacting plate, a post adapted to be formed on a side of the cover, two channels respectively defined in the post and a press provided on top of the post and having two second extensions received in the two channels and selectively extending downward to correspond to the two second holes of the hollow handle, whereby extension of the two second extensions is able to force the sliding block to move downward to the base and into the first holes to force the second contacting plate to engage with the first contacting plate to complete a circuit of the blender.

Other objects, advantages and novel features of the invention will become more apparent from the following detailed description when taken in conjunction with the accompanying drawings.

DETAILED DESCRIPTION OF THE PREFERRED EMBODIMENT

Figure 1:
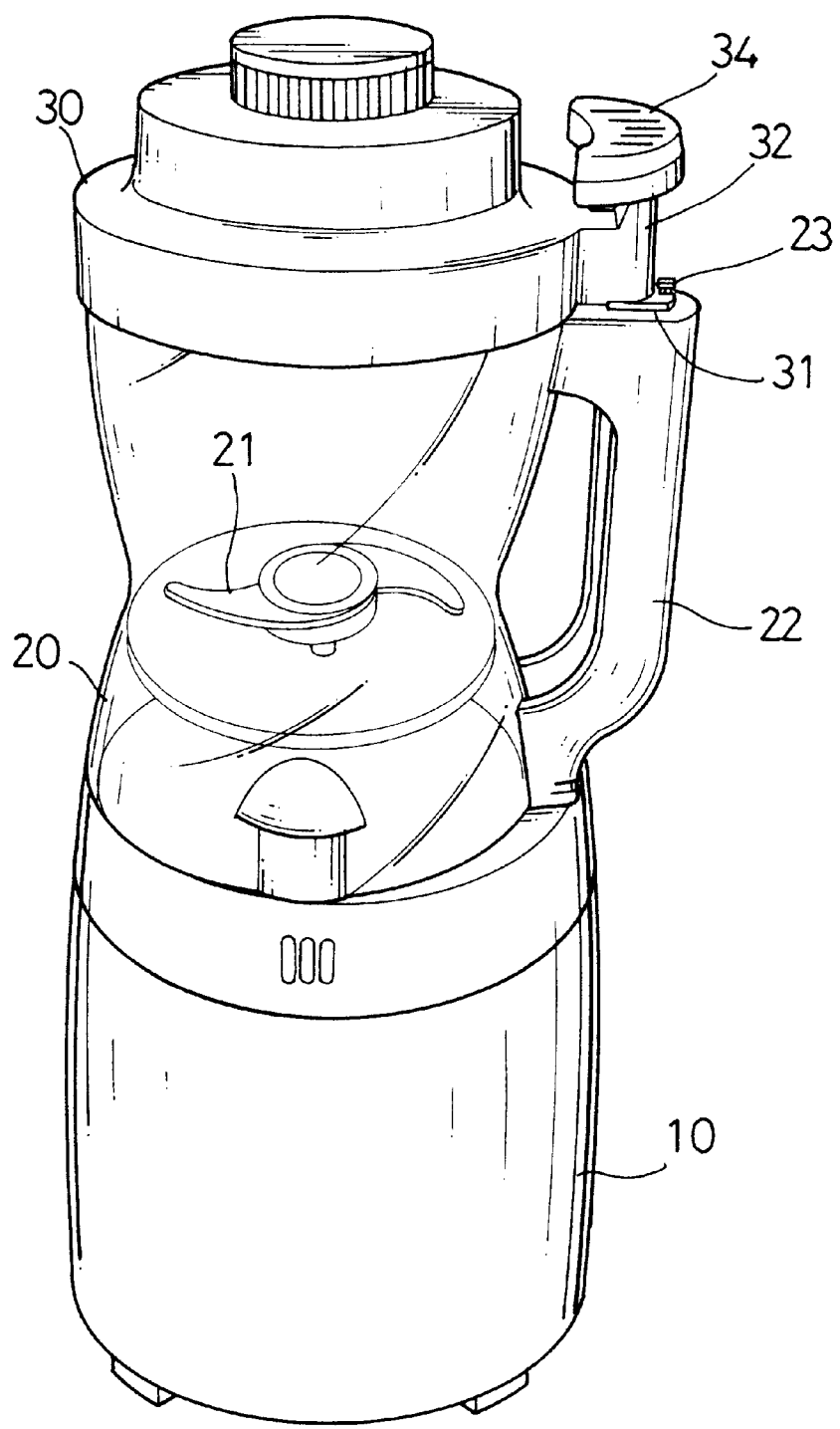
FIG. 1 is a perspective view of the blender in accordance with the present invention.
Figure 2:
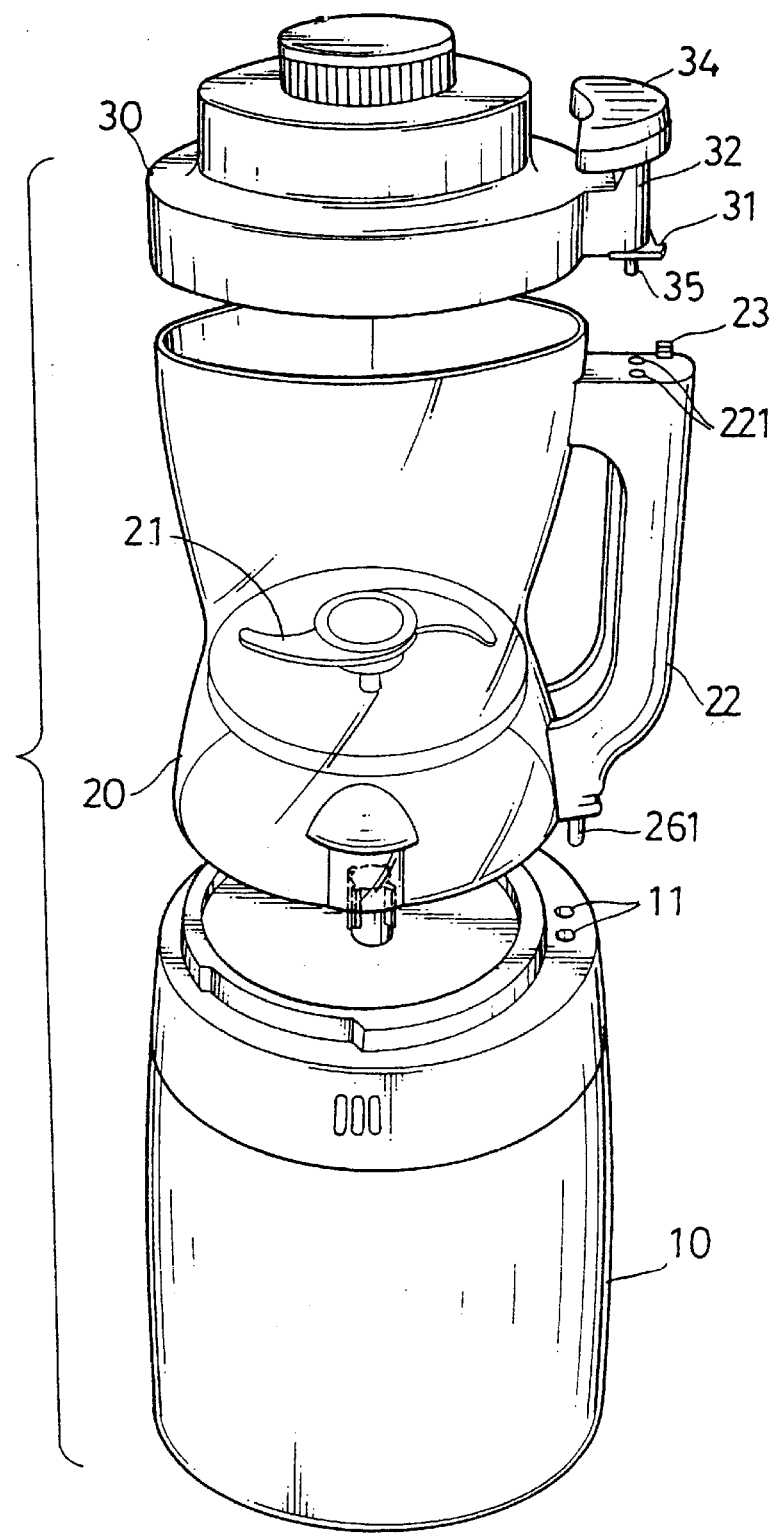
FIG. 2 is an exploded perspective view of the blender in FIG. 1.

With reference to FIG. 1, a blender in accordance with the present invention has a base (10), a cup (20) mounted on top of the base (10) and having a blade (21) controllably connected to the base (10) so as to be rotatably received in the cup (20) and a hollow handle (22) integrally formed on an outer periphery of the cup (20) and a cover (30) detachably mounted on top of the cup (20) to cover the open end of the cup (20).

The connection between the base (10) and the blade (21) is well known in the art, thus detailed description concerning how the motor (not shown) and the blade (21) are controlled is omitted hereinafter.

With reference to FIGS. 2, 3, 4 and 5, the base (10) has two first holes (11) defined in a top face of the base (10) and a first contacting plate (12) formed inside the base (10) to connect to a power source of the blender.

Besides the blade (21) and the hollow handle (22), the cup (20) further has two second holes (221) defined in a top face of the hollow handle (22) to communicate with an inside of the hollow handle (22), a boss (23) formed on the top face of the hollow handle (22), two third holes (24) defined in a bottom face of the hollow handle (22), a first stop (25) formed on an inner periphery of the hollow handle (22), a sliding block (26) movably received inside the hollow handle (22), and elongated through hole (27) longitudinally defined in the sliding block (26) to correspond to the first stop (25), a second stop (28) formed on an inner face of the sliding block (26) and a first spring (29) connected between the first stop (25) and the second stop (28). The sliding block (26) has two extensions (261) respectively extending out from the two third holes (24) to correspond to the two first holes (11). A second contacting plate (262) is formed inside the base (10) and spaced apart from the first contacting plate (12). The second contacting plate (262) is connected to a load, such as the motor of the blender. However, because the first contacting plate (12) and the second contacting plate (262) are separate from each other, no circuit is completed.

The cover (30) has a buckle (31) formed on a bottom of a post (32) which is formed on a side of the cover (30), two channels (33) respectively defined in the post (32), a press (34) formed on top of the post (32) and having two second extensions (35) extending downward to correspond to the two second holes (221) of the hollow handle (22), a spring hole (36) defined between the two channels (33) to receive therein a second spring (37) and a guide (38) formed on a bottom face of the press (34) to engage with the second spring (37) to direct the movement of the second spring (37).

Figure 3:
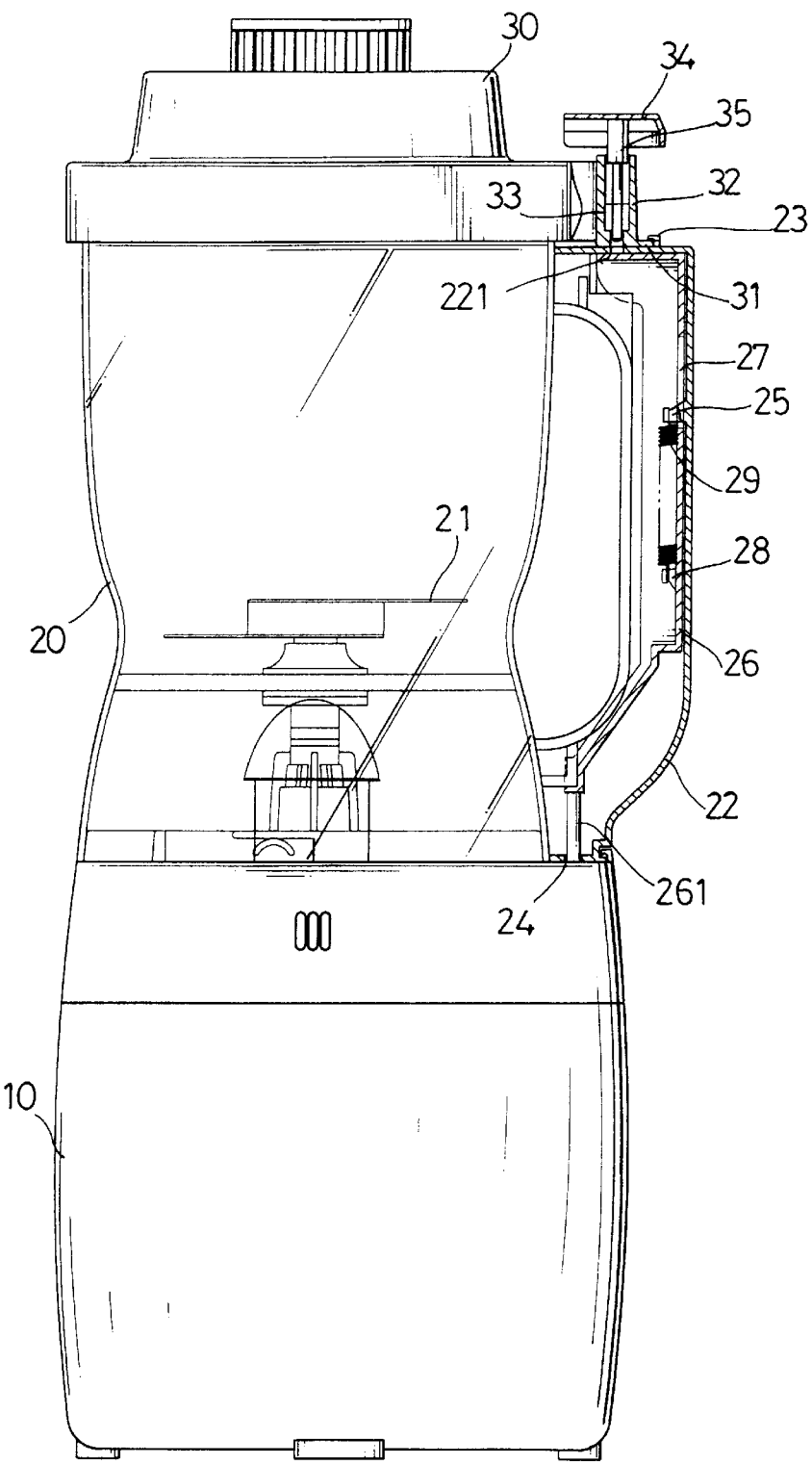
FIG. 3 is a side plan view showing the safety device is mounted in the handle of the blender.
Figure 6:
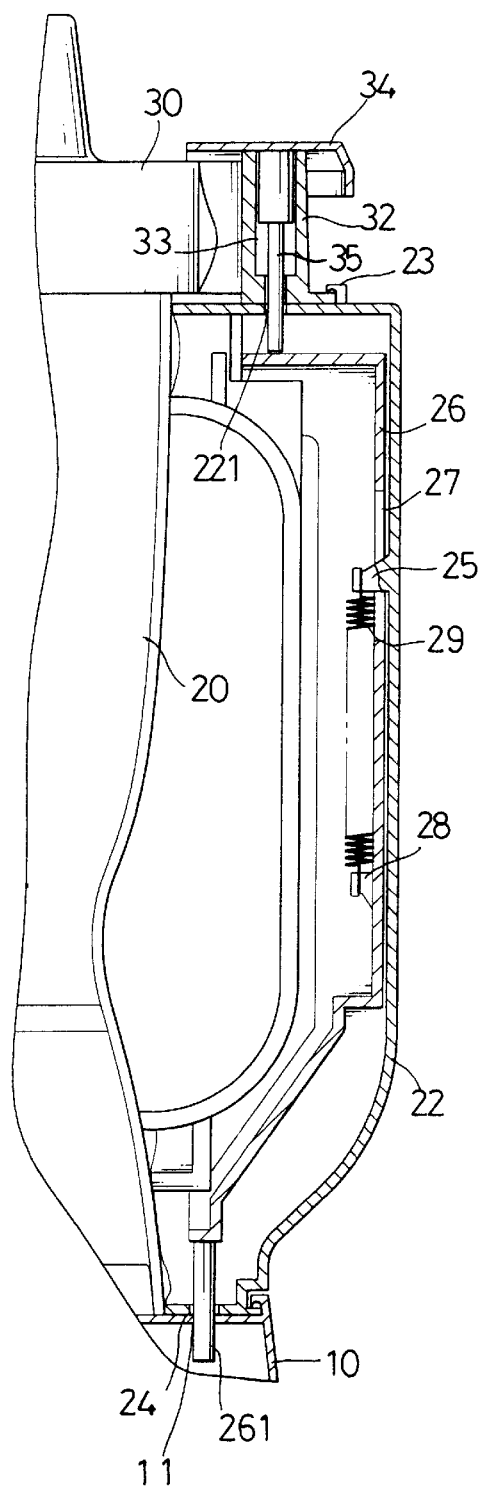
FIG. 6 is a schematic view showing that the press is pushed downward.
Figure 4:
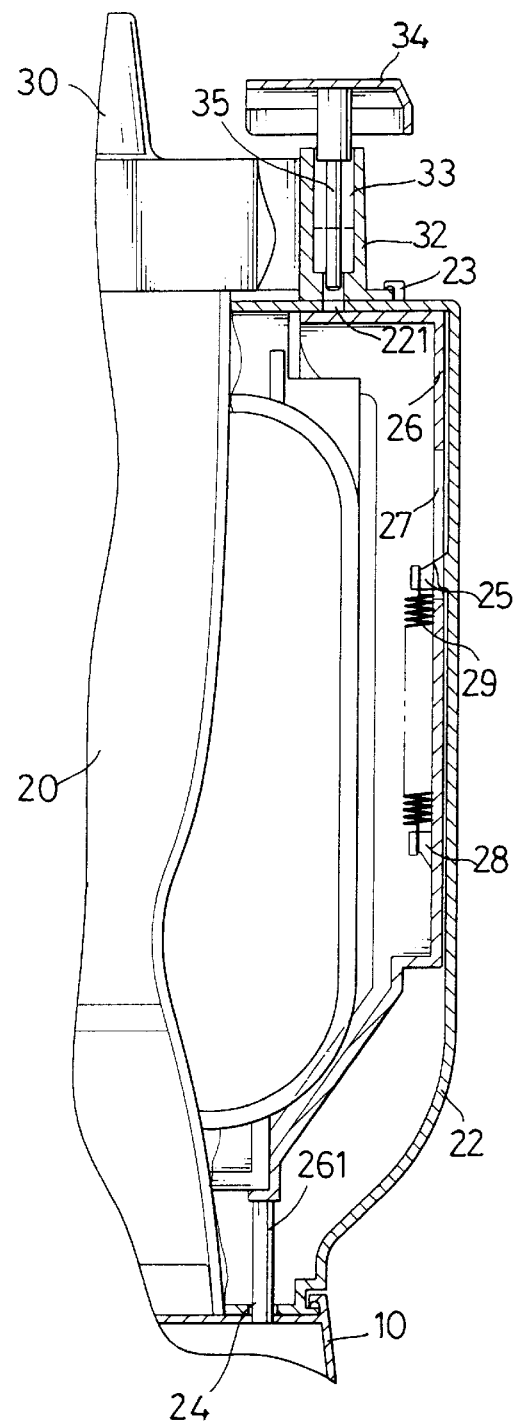
FIG. 4 is an enlarged schematic side plan view of the handle.
Figure 5:
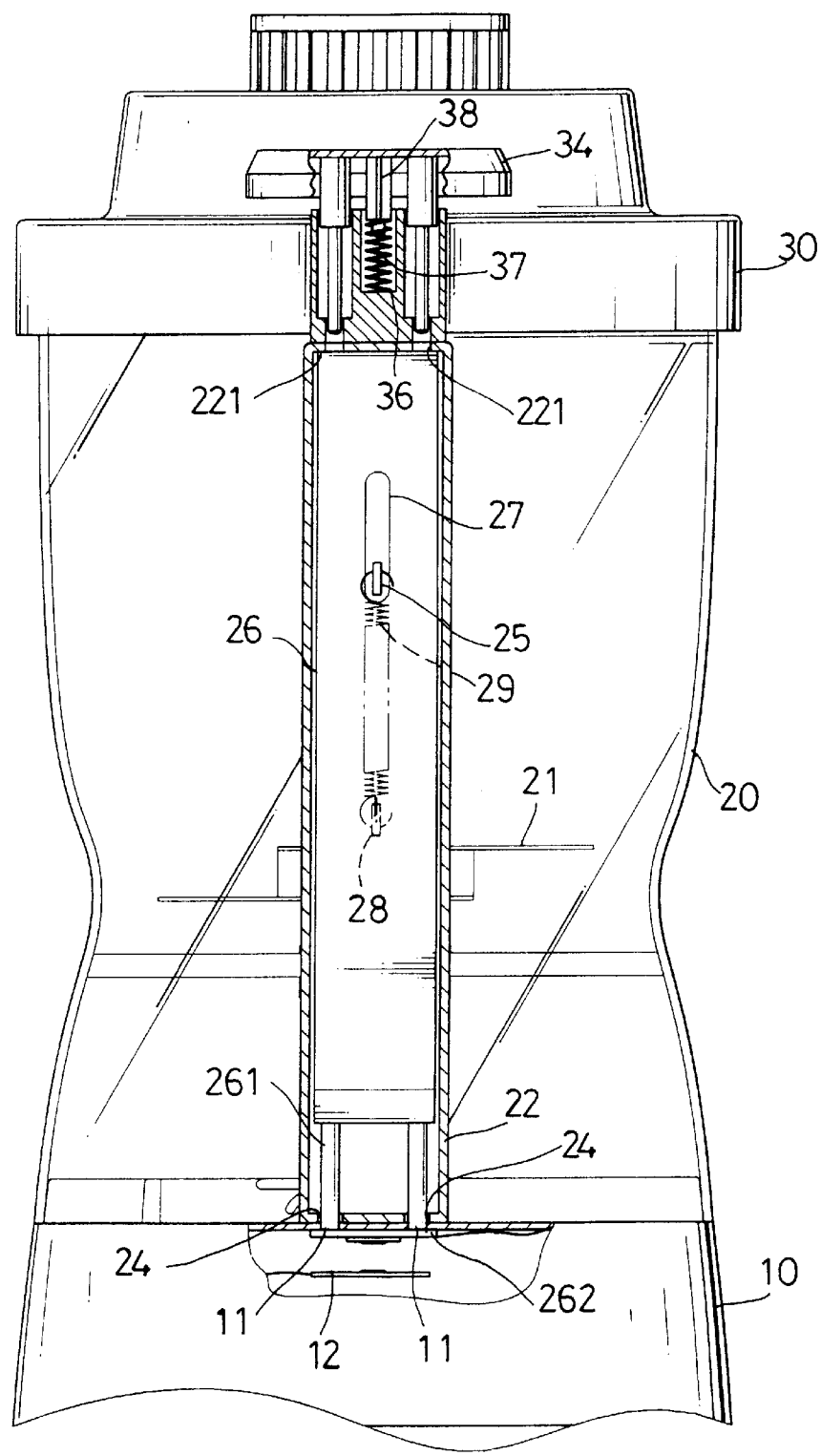
FIG. 5 is a schematic view showing the safety device in FIG. 3.
Figure 7:
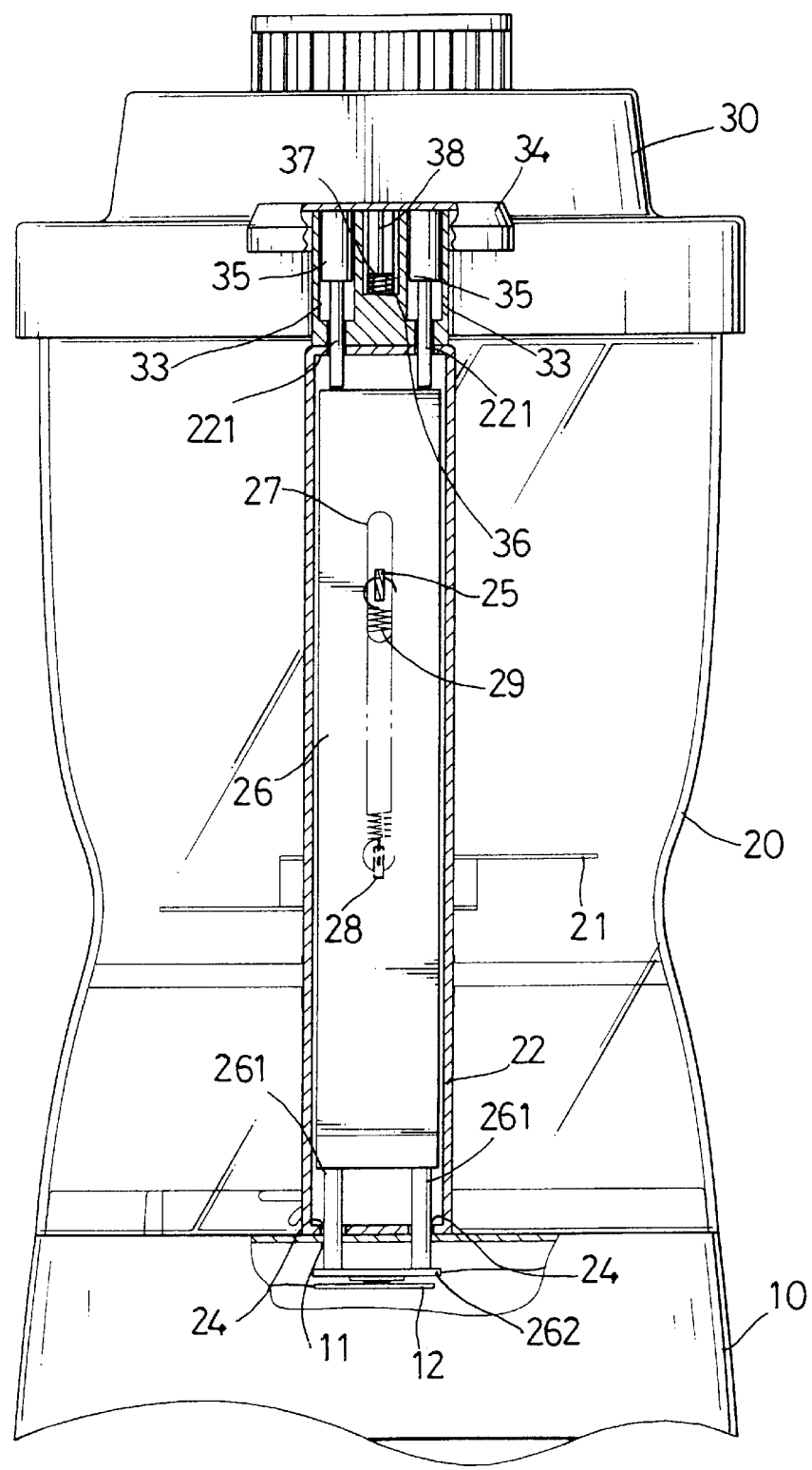
FIG. 7 is a schematic view showing the movement of the press triggers the engagement between the contacting plates.

With reference to FIGS. 1, 3 and 4, when the blender of the present invention is assembled, it is noted that the second extensions (35) are received in the respective channels (33) and the block (31) is engaged with the boss (23). Because the boss (23) is L shaped, the user is able to secure the engagement between the cover (30) and the cup (20). Furthermore, the extensions (261) are also received in the hollow handle (22), which results in that the first contacting plate (12) and the second contacting plate (262) are not engaged with each other and the blender is not able to function.

With reference to FIGS. 5 to 8, when the blender of the present invention is in use, the user presses downward the press (34) to extend the two second extensions (35) out of the respective channels (33) and into the corresponding second holes (221). After the second extensions (35) extend into the second holes (221), the second extensions (35) engage with the sliding block (26) so that the sliding block (26) is forced to move by the second extensions (35). While the sliding block (26) is moving, the extensions (261) integrally formed on a bottom of the sliding block (26) extend out of the third holes (24) and into the first holes (11) to engage the second contacting plate (262). Because of the movement of the extensions (261), the second contacting plate (262) engages with the first contacting plate (12) so that a circuit is completed.

When the user continues to press the press (34), it is to be noted that the second spring (37) is compressed by the guide (38) in the spring hole (36) and the first spring (29) extends in the elongated through hole (27) in the hollow handle (22). However, when the press (34) is released, the press (34) returns to its original position due to the extension of the second spring (37) and thus the second extensions (35) retract to the channels (33). Meanwhile, the sliding block (26) is moving upward due to the first spring (29) and thus the extensions (261) retract into the third holes (24). Under such a situation, the second contacting plate (262), based on its own resilience, leaves the engagement with the first contacting plate (12), which breaks the electrical circuit of the blender.

Therefore, it is concluded that the user's safety is secured because only when the press (34) is pressed downward to force the second extensions (35) to push the sliding block (26) and the extensions (261) to extend into the first holes (11) to push the second contacting plate (262) to engage the first contacting plate (12), the electrical circuit of the blender is established. Accordingly, if the press (34) is not pressed downward, the second extensions (35) will not extend out of the channels (33) and into the corresponding second holes (221). Thus, the extensions (261) will not extend out of the third holes (24) and into the corresponding first holes (11) and a complete electrical circuit will not be established. That is, only when all the parts of the blender are appropriately assembled and the appropriate operation procedure is taken, the blender is able to work.

Figure 8:
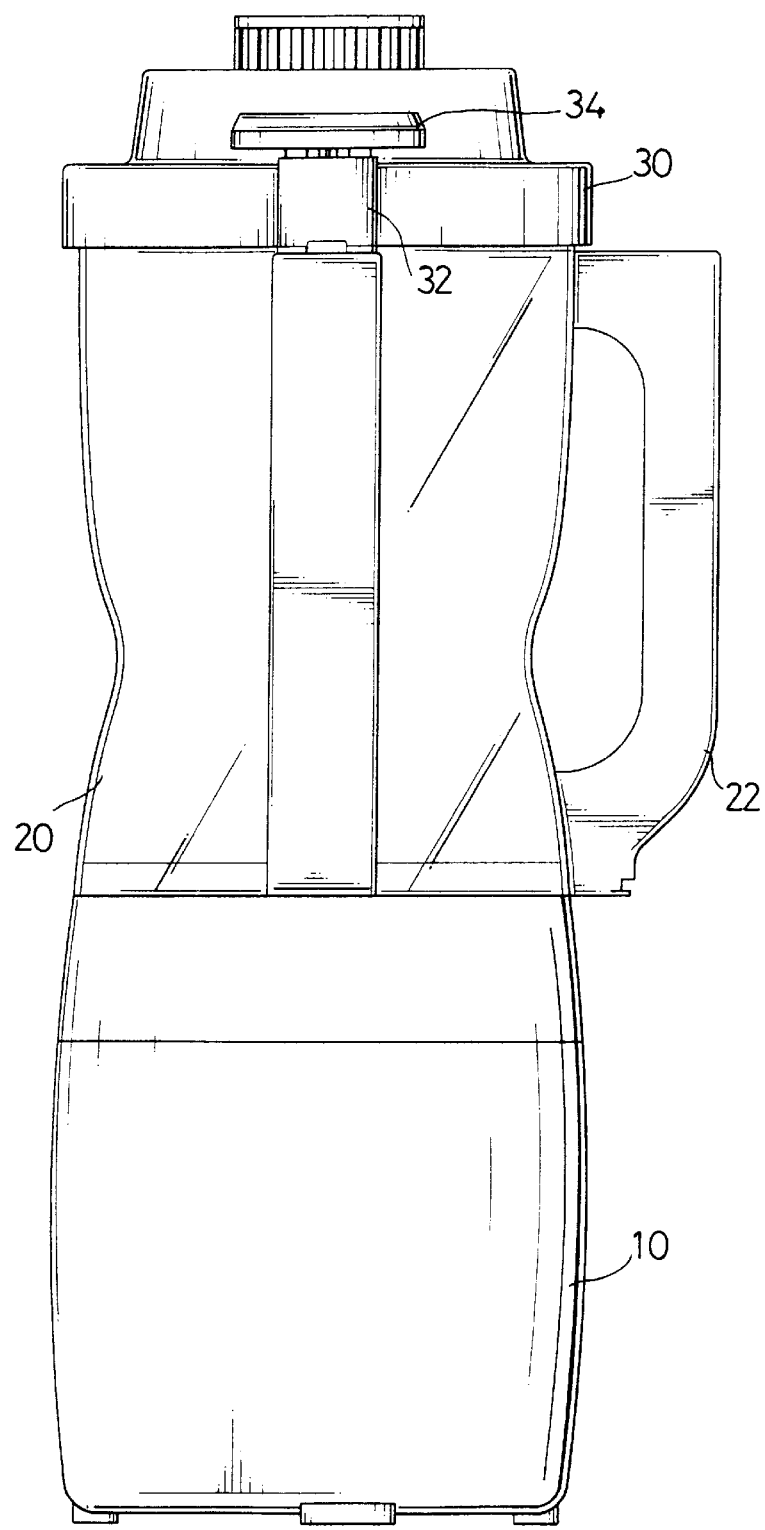
FIG. 8 is a side plan view showing that the safety device may be mounted on the cup instead of the handle.

With reference to FIG. 8, the safety device of the present invention may be mounted on a side of the cup (20) instead of the handle (22).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A safety device for a blender having a base, a cup detachably connected to the base and having a hollow handle integrally formed on a side of the cup and a cover detachably connected to the cup, the safety comprising:

a switch adapted to be received in the base;

two first holes defined in a top face of the base;

two second holes adapted to be defined in a top face of the hollow handle to communicate with an inside of the hollow handle, two third holes adapted to be defined in a bottom face of the hollow handle, a first stop adapted to be formed on an inner periphery of the hollow handle, a sliding block adapted to be movably received inside the hollow handle, an elongated through hole longitudinally defined in the sliding block to correspond to the first stop, a second stop formed on an inner face of the sliding block, a first spring connected between the first stop and the second stop to provide a recoil force to the sliding block and two extensions respectively formed on a bottom of the sliding block to selectively extend out from the two third holes to correspond to the two first holes so as to engage with and press a first contacting plate which is adapted to connect to a power source;

a post adapted to be formed on a side of the cover, two channels respectively defined in the post and a press provided on top of the post and having two second extensions received in the two channels and selectively extending downward to correspond to the two second holes of the hollow handle, whereby extension of the two second extensions is able to force the sliding block to move downward to the base and into the first holes to force the first contacting plate to engage with a second contacting plate which is adapted to connect to a motor to complete an electrical circuit of the blender so that the motor is able to drive a blade to rotate.

2. The safety device as claimed in claim 1, wherein the post further has a buckle formed on a bottom of the post and an L shaped boss is adapted to be formed on a top face of the hollow handle to correspond to the buckle so that engagement between the cover and the cup is secured when the buckle is clamped by the L shaped boss.

3. The safety device as claimed in claim 2, wherein a spring hole is defined between the two channels to receive therein a second spring so that a recoil force is provided to the press and a guide is formed on a bottom face of the press to engage with the second spring and direct movement of the second spring.

4. The safety device as claimed in claim 1, wherein a spring hole is defined between the two channels to receive therein a second spring so that a recoil force is provided to the press and a guide is formed on a bottom face of the press to engage with the second spring and direct movement of the second spring.

* * * * *